(12) United States Patent
Kim

(10) Patent No.: US 12,548,787 B2
(45) Date of Patent: Feb. 10, 2026

(54) HUMIDIFIER FOR FUEL CELL

(71) Applicants: HYUNDAI MOTOR COMPANY, Seoul (KR); KIA CORPORATION, Seoul (KR)

(72) Inventor: Jong Sung Kim, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 722 days.

(21) Appl. No.: 17/990,194

(22) Filed: Nov. 18, 2022

(65) Prior Publication Data

US 2023/0268524 A1    Aug. 24, 2023

(30) Foreign Application Priority Data

Feb. 22, 2022    (KR) .................. 10-2022-0022788

(51) Int. Cl.
| | | |
|---|---|---|
| H01M 8/04 | (2016.01) | |
| B01F 23/21 | (2022.01) | |
| H01M 8/04119 | (2016.01) | |
| H01M 8/0438 | (2016.01) | |
| H01M 8/04492 | (2016.01) | |

(52) U.S. Cl.
CPC ......... H01M 8/04141 (2013.01); B01F 23/21 (2022.01); H01M 8/04432 (2013.01); H01M 8/04492 (2013.01); H01M 8/04507 (2013.01); H01M 2250/20 (2013.01)

(58) Field of Classification Search
CPC ......... H01M 8/04141; H01M 8/04492; H01M 8/04507; B01F 23/21
See application file for complete search history.

(56) References Cited

U.S. PATENT DOCUMENTS 10,122,033 B2 * 11/2018 Knies .................. H01M 8/0438

FOREIGN PATENT DOCUMENTS

| CN | 110828860 A | * | 2/2020 | ........ H01M 8/04126 |
| DE | 102013017542 A1 | * | 4/2015 | ........ H01M 8/04089 |
| DE | 102014017301 A1 | | 6/2015 | |
| JP | 3871251 B2 | | 1/2007 | |

* cited by examiner

*Primary Examiner* — Robert A Hopkins
(74) *Attorney, Agent, or Firm* — MCDONNELL BOEHNEN HULBERT & BERGHOFF LLP

(57) ABSTRACT

A humidifier for a fuel cell is configured to humidify dry air to be supplied to a fuel cell stack with wet air discharged from the fuel cell stack. The humidifier includes a housing provided such that the dry air and the wet air pass therethrough, a moisture transfer member provided in the housing to transfer moisture in the wet air to the dry air, a bypass flow path provided to guide a part of the dry air to bypass the housing, and a flow regulating valve provided to be driven using a pressure difference between the inside and outside of the housing as a power source to adjust a flow rate of the dry air passing through the bypass flow path.

17 Claims, 7 Drawing Sheets

HUMIDIFIER FOR FUEL CELL

CROSS REFERENCE TO RELATED APPLICATIONS

This application is based on and claims priority under 35 U.S.C. § 119 to Korean Patent Application No. 10-2022-0022788, filed on Feb. 22, 2022, in the Korean Intellectual Property Office, the disclosure of which is incorporated by reference herein in its entirety.

BACKGROUND

1. Field

The disclosure relates to a humidifier for a fuel cell capable of adjusting an amount of humidification to be supplied to a fuel cell stack.

2. Description of the Related Art

A fuel cell system refers to a kind of power generation system that generates electric energy through an electrochemical reaction between hydrogen and air by a fuel cell.

Such a fuel cell system is used to drive an electric power driving source such as an electric motor in a vehicle, a ship, a train, an airplane, and the like.

The fuel cell system includes a stack that is an assembly of fuel cells including a cathode and an anode, an air supply device for supplying air to the cathode of the fuel cells, and a hydrogen supply device for supplying hydrogen to the anode of the fuel cells.

In the case of a polymer fuel cell, adequate moisture is required for an ion exchange membrane of a membrane-electrode assembly (MEA) to function smoothly.

Therefore, the air supply device of the fuel cell system may include a humidifier for humidifying air to be supplied to the fuel cell.

The humidifier humidifies the dry air supplied through an air compressor of the air supply device by using moisture in the high-temperature and humid air discharged from the cathode of the fuel cell, and supplies the humidified air to the cathode of the fuel cell.

In the fuel cell system, the performance and durability of the stack may be determined depending on an amount of humidification of a humidifier. For example, when the amount of humidification of the humidifier is insufficient, the stack may be dried, which may deteriorate the performance thereof, and when the amount of humidification of the humidifier is excessive, flooding may occur in the stack, which may cause a problem in the durability of the stack.

Therefore, a humidifier employed in the fuel cell system needs to appropriately adjust an amount of humidification to be supplied to the stack in response to the output of the fuel cell.

SUMMARY

It is an aspect of the disclosure to provide a humidifier for a fuel cell capable of adjusting an amount of humidification to be supplied to a fuel cell stack in response to the output of the fuel cell without using an electromagnetic valve.

Additional aspects of the disclosure will be set forth in part in the description which follows and, in part, will be obvious from the description, or may be learned by practice of the disclosure.

In accordance with an aspect of the disclosure, a humidifier for a fuel cell, which is provided to humidify dry air to be supplied to a fuel cell stack with wet air discharged from the fuel cell stack, includes a housing provided such that the dry air and the wet air pass therethrough, a moisture transfer member provided in the housing to transfer moisture in the wet air to the dry air, a bypass flow path provided to guide a part of the dry air to bypass the housing, and a flow regulating valve provided to be driven using a pressure difference between the inside and outside of the housing as a power source to adjust a flow rate of the dry air passing through the bypass flow path.

The flow regulating valve may include a hollow valve body including a first communication hole provided at one end thereof to communicate with the inside of the housing, a second communication hole provided at the other end thereof to communicate with the outside of the housing, and a pair of third communication holes provided on opposite sides between the one end and the other end to communicate with a middle portion of the bypass flow path, and a valve stem slidably mounted on the valve body between the first communication hole and the second communication hole to adjust an opening degree of the third communication hole.

When a pressure inside the housing is greater than a pressure outside the housing, the valve stem may slide toward the second communication hole by the pressure inside the housing acting toward one end surface in a longitudinal direction thereof through the first communication hole.

The valve stem may have a passing flow path provided to penetrate the valve stem in a direction orthogonal to a sliding direction of the valve stem to enable communication with the third communication hole.

The flow regulating valve may include an elastic member disposed between the second communication hole and the valve stem to elastically support the valve stem.

The elastic member may include a coil spring having one end supported on one end of the valve body at a circumference of the second communication hole and the other end supported on one end surface of the valve stem corresponding to the second communication hole.

The passing flow path may be provided to enable alignment with the third communication hole.

When the pressure inside the housing and the pressure outside the housing are the same, the valve stem may be maintained in a communication state such that the passing flow path is aligned with the third communication hole.

As the pressure inside the housing increases such that the pressure difference with the pressure outside the housing increases, the valve stem may move such that a cross-sectional area of the passing flow path communicating with the third communication hole decreases.

When the pressure difference becomes larger than the set value, the valve stem may move such that the communication between the passing flow path and the third communication hole is blocked.

The flow regulating valve may further include a sealing member provided to seal a gap between an inner circumference of the valve body and an outer circumference of the valve stem.

An installation groove for installing the sealing member may be provided on the inner circumference of the valve body, and the sealing member is inserted into the installation groove.

The pressure outside the housing may be atmospheric pressure.

The pressure outside the housing may be atmospheric pressure, and the flow regulating valve may further include a foreign matter blocking cover coupled to the other end of the valve body to block the inflow of foreign matter into the second communication hole.

The foreign matter blocking cover may include a cover part provided to cover the other end of the valve body in a state of being spaced apart from the valve body, and a plurality of connecting parts disposed to be spaced apart from each other along a circumference of the second communication hole to connect the valve body and the cover part.

A friction reducing layer may be provided on at least one of an inner circumferential surface of the valve body and an outer circumferential surface of the valve stem.

The pressure outside the housing may be provided by a closed space.

BRIEF DESCRIPTION OF THE FIGURES

These and/or other aspects of the disclosure will become apparent and more readily appreciated from the following description of the embodiments, taken in conjunction with the accompanying drawings of which.

DETAILED DESCRIPTION

Figure 1:
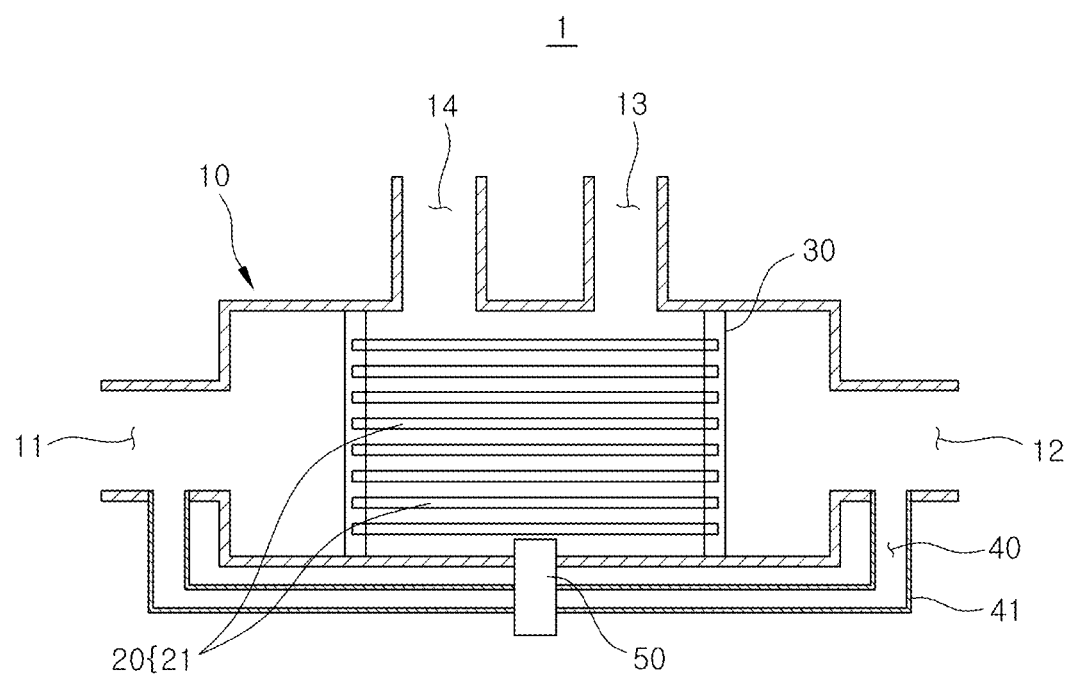
FIG. 1 illustrates a structure of a humidifier for a fuel cell according to an embodiment.

Hereinafter, an embodiment of the disclosure will be described in detail with reference to the accompanying drawings. The embodiment described below are provided by way of example so that those skilled in the art will be able to fully understand the spirit of the disclosure, and the disclosure is not limited to the embodiments described below, and may be embodied in other forms. In order to clearly explain the disclosure, parts not related to the description are omitted from the drawings, and the size of the components may be exaggerated for convenience.

A humidifier 1 for a fuel cell according to an embodiment, which is employed in a fuel cell system, is provided to humidify dry air to be supplied to a fuel cell stack using wet air discharged from the fuel cell stack.

The fuel cell system is a power generation system that generates electric energy through an electrochemical reaction between hydrogen and air by a fuel cell, and may be used to drive an electric power driving source such as an electric motor in a vehicle, a ship, a train, an airplane, and the like.

The fuel cell system includes a stack that is an assembly of fuel cells including a cathode and an anode, an air supply device for supplying air to the cathode of the fuel cells, and a hydrogen supply device for supplying hydrogen to the anode of the fuel cells.

In the case of a polymer fuel cell, adequate moisture is required for an ion exchange membrane of a membrane-electrode assembly (MEA) to function smoothly, and thus the humidifier 1 for the fuel cell according to an embodiment may be employed in the air supply device of the fuel cell system to humidify air to be supplied to the fuel cell stack.

The humidifier 1 for the fuel cell may include a housing 10 that forms an exterior. The air supply device of the fuel cell system may include an air compressor, and the air compressor may supply the compressed air to the fuel cell stack through the housing 10 by sucking and compressing external air.

The air compressor may increase an amount of air to be supplied to the fuel cell stack as the output of the fuel cell system increases.

The housing 10 may include a first inlet 11 provided to introduce dry air suctioned and compressed through the air compressor, and a first outlet 12 provided to discharge the dry air. Also, the housing 10 may include a second inlet 13 provided to introduce wet air discharged from the fuel cell stack and a second outlet 14 provided to discharge the wet air.

Accordingly, the dry air to be supplied to the fuel cell stack and the wet air discharged from the fuel cell stack may pass through the inside of the housing 10.

The first inlet 11 and the first outlet 12 may be provided at opposite ends along a longitudinal direction (left-right direction in FIG. 1) of the housing 10, and the second inlet 13 and the second outlet 14 may be provided between the opposite ends of the housing 10.

A moisture transfer member 20 provided to transfer moisture in the wet air to the dry air may be provided inside the housing 10.

The moisture transfer member 20 may include a hollow fiber membrane 21 disposed in the longitudinal direction of the housing 10, and a plurality of the hollow fiber membranes 21 may be provided. The plurality of hollow fiber membranes 21 may be arranged to form a bundle inside the housing 10 between the first inlet 11 and the first outlet 12, and opposite ends of the hollow fiber membranes 21 forming the bundle may be potted through a fixing layer 30.

By the arrangement of the housing 10 and the moisture transfer member 20 as described above, the dry air introduced into the first inlet 11 of the housing 10 from the air compressor may flow along hollow portions of the hollow fiber membranes 21, and the wet air discharged from the fuel cell stack and introduced into the housing 10 through the second inlet 13 may come into contact with outer surfaces of the hollow fiber membranes 21 and then be discharged to the outside of the housing 10 through the second outlet 14.

When wet air comes into contact with the outer surfaces of the hollow fiber membranes 21, the moisture contained in the wet air may penetrate the hollow fiber membranes 21 and humidify the dry air flowing along the hollow portions of the hollow fiber membranes 21. Accordingly, the dry air discharged to the outside of the housing 10 through the first outlet 12 may be supplied to the fuel cell stack in a humidified state.

The humidifier 1 for the fuel cell, which is for adjusting the amount of humidification of air to be supplied to the fuel cell stack, may further include a bypass flow path 40 provided to guide a part of dry air to bypass the housing 10, and a flow regulating valve 50 provided to adjust a flow rate of dry air passing through the bypass flow path 40.

The bypass flow path 40 may be formed of a pipe 41 provided inside the housing 10 between the first inlet 11 and the first outlet 12 to be connected to the outside of the housing 10 so that a part of the dry air guided to the first inlet 11 is supplied to the fuel cell stack through the first outlet 12 in a non-humidified state, and the flow regulating valve 50 may adjust the flow rate of thy air passing through the bypass flow path 40.

The amount of humidification of air to be supplied to the fuel cell stack may be the sum of an amount of humidification of dry air passing through the housing 10 and an amount of humidification of dry air passing through the bypass flow path.

As the flow rate of dry air passing through the bypass flow path 40 increases, the amount of humidification of air to be supplied to the fuel cell stack may decrease, and as the flow rate of dry air passing through the bypass flow path 40 decreases, the amount of humidification of air to be supplied to the fuel cell stack may increase.

The flow regulating valve 50 may be provided to be driven using a pressure difference between the inside and outside of the housing 10 as a power source to adjust the flow rate of dry air passing through the bypass flow path 40.

Because the flow regulating valve 50 that is driven using the pressure difference between the inside and outside of the housing 10 includes a solenoid, the flow regulating valve 50 may be manufactured at a lower cost compared to an electromagnetic valve that is operated depending on an electrical signal, thereby effectively contributing to increasing the overall price competitiveness of the fuel cell system.

In particular, in the case of a vehicle using the fuel cell system as a driving source for a motor, because recently, the cost of the fuel cell system must be continuously lowered in order to secure price competitiveness with an internal combustion engine vehicle, an advantage of employing the flow regulating valve 50 in a humidifier for a fuel cell may more effectively work.

Figure 2:
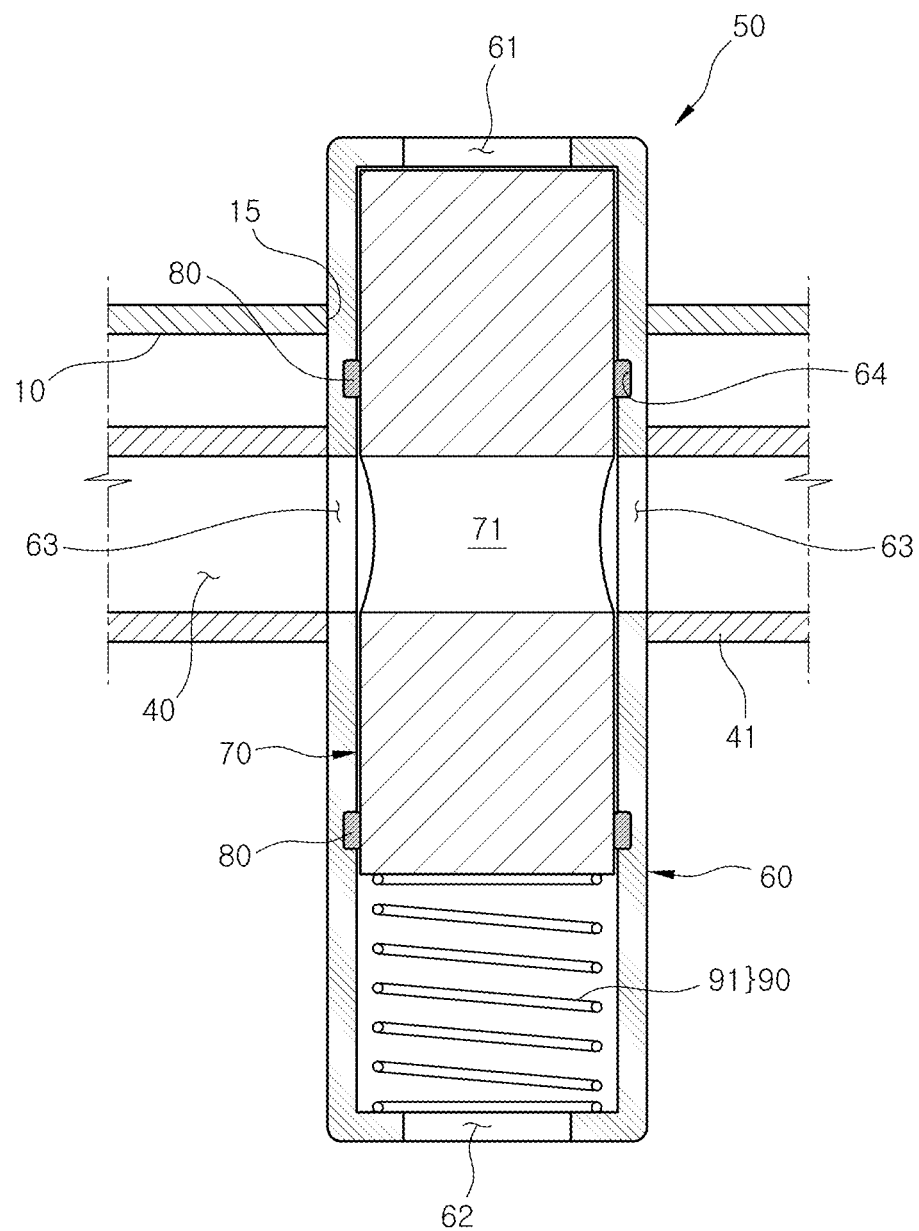
FIG. 2 illustrates the structure of the humidifier for the fuel cell according to an embodiment in a state in which a bypass flow path is maximally opened.

As illustrated in FIG. 2, the flow regulating valve 50 may include a valve body 60 and a valve stem 70 installed on the valve body 60.

The valve body 60 may include a first communication hole 61 provided at one end thereof to communicate with the inside of the housing 10, a second communication hole 62 provided at the other end thereof to communicate with the outside of the housing 10, and a pair of third communication holes 63 provided on opposite sides between the one end and the other end to communicate with a middle portion of the bypass flow path 40.

A pressure outside the housing 10 may be atmospheric pressure. Therefore, the first communication hole 61 may communicate the inside of the housing 10 and the inside of the valve body 60 so that the pressure inside the housing 10 acts on the valve stem 70, and the second communication hole 62 may communicate the atmosphere and the inside of the valve body 60 so that the atmospheric pressure acts on the valve stem 70.

The valve body 60 may be installed to vertically cross the bypass flow path 40, and a coupling hole 15 may be provided at one side of the housing 10 so that one end of the valve body 60 at which the first communication hole 61 is formed in a longitudinal direction (up-down direction in FIG. 2) is coupled to the coupling hole 15. The valve body 60 may be integrally connected to the housing 10 as the one end in the longitudinal direction is coupled to the coupling hole 15.

The valve stem 70 may be slidably mounted on the valve body 60 between the first communication hole 61 and the second communication hole 62 to adjust an opening degree of the third communication hole 63, thereby adjusting the flow rate of dry air passing through the bypass flow path 40.

The first communication hole 61 and the second communication hole 62 may prevent the valve stem 70 moving to one end or the other end of the valve body 60 from escaping to the outside of the valve body 60 by being formed to be smaller than a diameter of the valve stem 70.

The valve stem 70 may be provided in the form of a column whose cross section coincides with a cross section of a hollow portion of the valve body 60 so that sliding operation performance of the valve stem 70 may be ensured. The valve stem 70 may be mounted on the valve body 60 to be slidable along the longitudinal direction of the valve body 60 in a state where an outer circumference thereof is in close contact with an inner circumference of the valve body 60. The valve stem 70 may be provided in a circular or rectangular column shape.

Therefore, the valve stem 70 may slide smoothly inside the valve body 60 by a pressure inside the housing 10 or the atmospheric pressure acting on opposite ends.

The flow regulating valve 50 may include a sealing member 80 provided to seal a gap between the inner circumference of the valve body 60 and the outer circumference of the valve stem 70.

The sealing member 80 may ensure that the sliding operation of the valve stem 70 is performed more smoothly by blocking the pressure inside the housing 10 or the atmospheric pressure acting on one end of the valve stem 70 from leaking between the valve stem 70 and the valve body 60.

An installation groove 64 for installing the sealing member 80 may be provided on the inner circumference of the valve body 60 to suppress the sealing member 80 from interfering with the sliding operation of the valve stem 70, and the sealing member 80 may be inserted to be seated in the installation groove 64. A plurality of the sealing members 80 may be provided to be spaced apart from each other along the longitudinal direction of the valve body 60.

Figure 5:
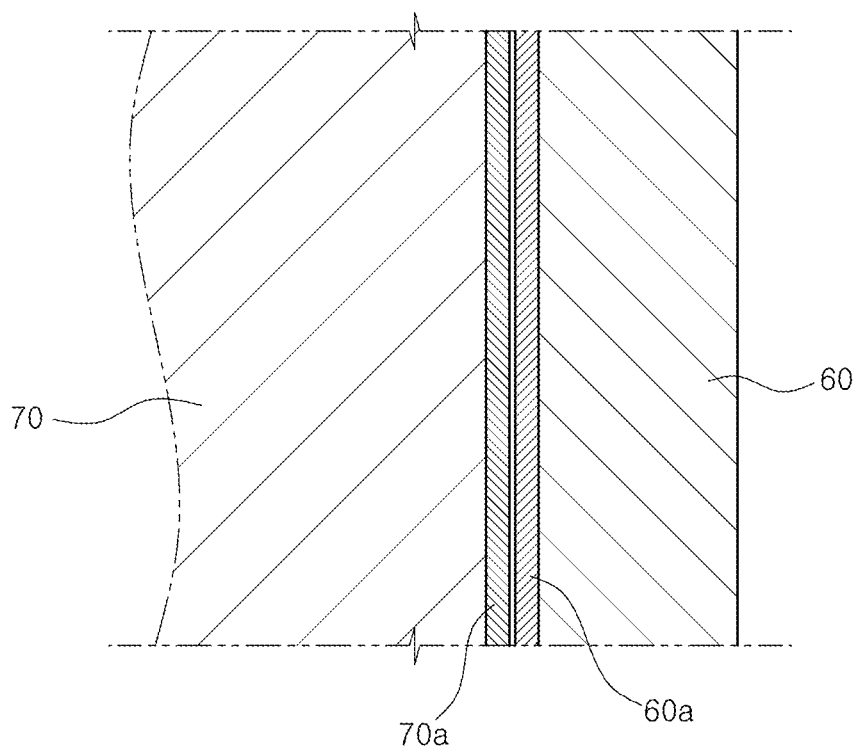
FIG. 5 is an enlarged view illustrating a contact surface between a valve body and a valve stem in a flow regulating valve of the humidifier for the fuel cell according to an embodiment.

As illustrated in FIG. 5, friction reducing layers 60*a* and 70*a* may be provided on an inner circumferential surface of the valve body 60 and an outer circumferential surface of the valve stem 70, respectively.

The friction reducing layers 60*a* or 70*a* may be provided by coating a material exhibiting a friction reducing effect on the inner circumferential surface of the valve body 60 or the outer circumferential surface of the valve stem 70.

The friction reducing layers 60*a* and 70*a* may reduce a resistance due to friction between the valve body 60 and the valve stem 70 to allow the valve stem 70 to slide more smoothly in the valve body 60 by the pressure inside the housing 10 or the atmospheric pressure.

Even when the friction reducing layer 60*a* and 70*a* is provided on only one of the inner circumferential surface of the valve body 60 and the outer circumferential surface of the valve stem 70, the friction force depending on a relative motion of the valve body 60 and the valve stem 70 may be reduced.

Therefore, even when the friction reducing layers 60*a* and 70*a* are provided only on at least one of the inner circumferential surface of the valve body 60 and the outer circumferential surface of the valve stem 70, the sliding operation performance of the valve stem 70 may be improved.

Figure 3:
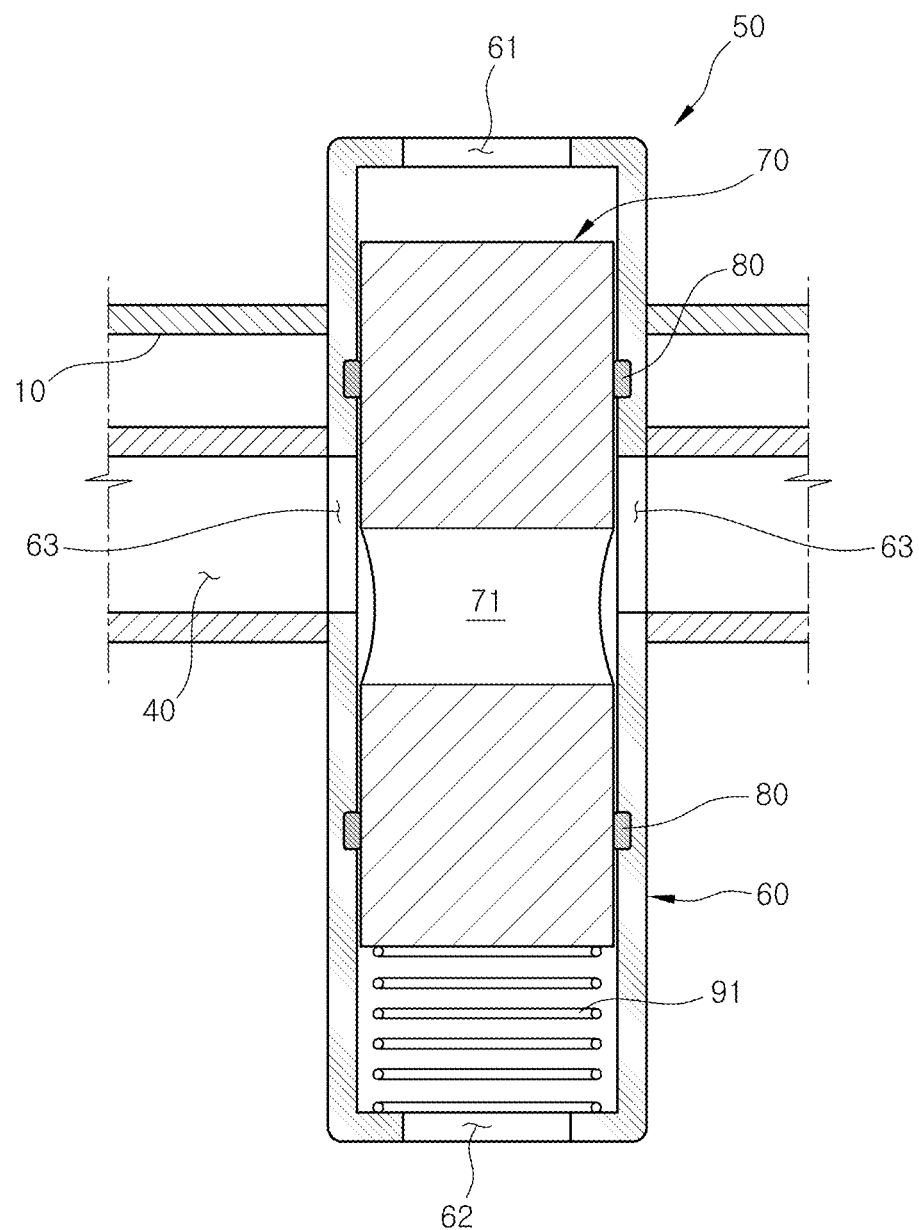
FIG. 3 illustrates a state in which a part of the bypass flow path in FIG. 2 is blocked.
Figure 4:
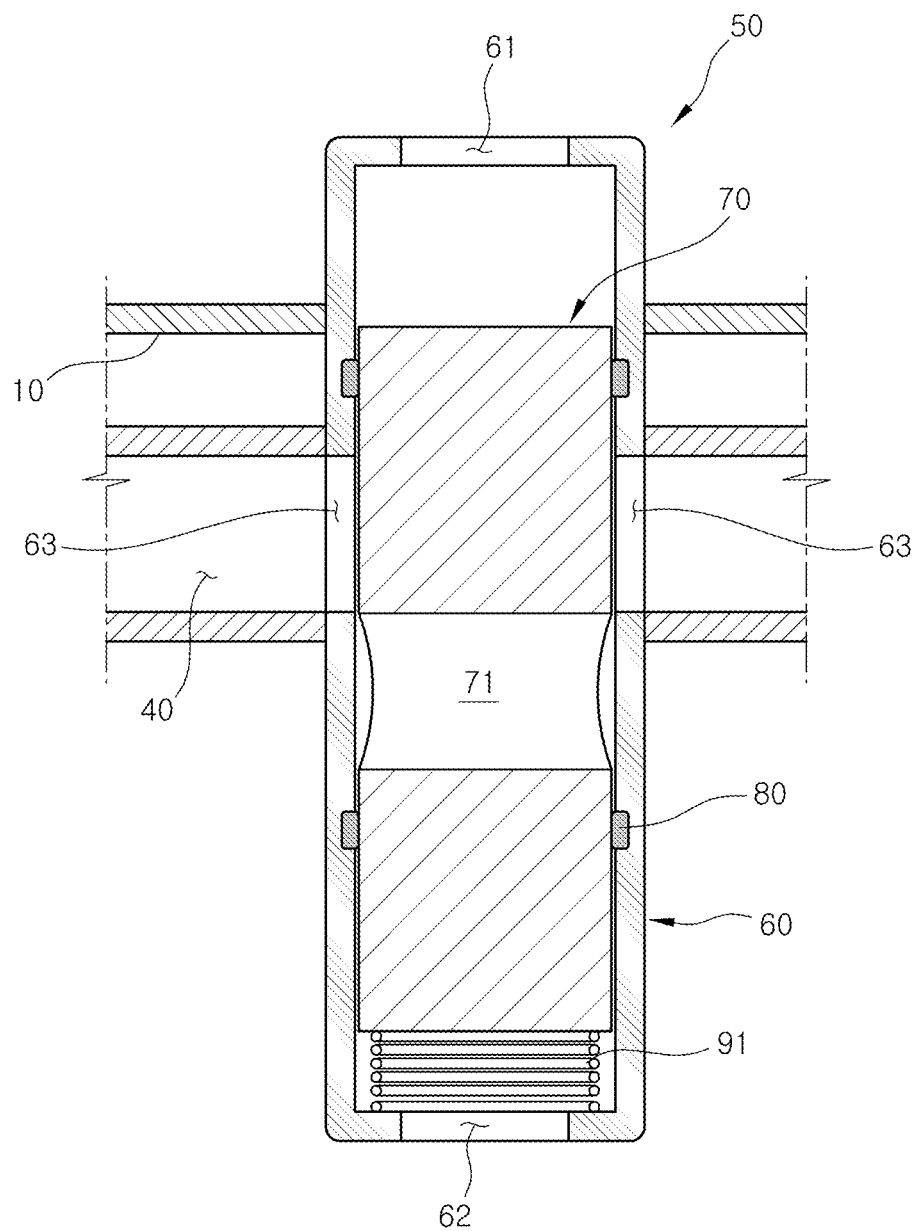
FIG. 4 illustrates a state in which the bypass flow path in FIG. 3 is completely blocked.

Referring to FIGS. 2 to 4, when the pressure inside the housing 10 is greater than the atmospheric pressure, the valve stem 70 may adjust the opening degree of the third communication hole 63 while sliding toward the second communication hole 62 by the pressure inside the housing 10 acting toward one end surface in the longitudinal direction through the first communication hole 61.

The valve stem 70 may have a passing flow path 71 provided to penetrate the valve stem 70 in a direction orthogonal to a sliding direction of the valve stem 70 to enable communication with the third communication hole 63, and as a communication area in which the passing flow path 71 communicates with the third communication hole 63 changes depending on a sliding position of the valve stem 70, the opening degree of the third communication hole 63 communicating with the bypass flow path 40 may be adjusted.

The flow regulating valve 50 may include an elastic member 90 disposed between the second communication hole 62 and the valve stem 70 to elastically support the valve stem 70.

As described above, the valve stem 70 may slide toward the second communication hole 62 by a pressure difference between the pressure inside the housing 10 and the atmospheric pressure. In this state, the elastic member 90 may slide the valve stem 70 toward the first communication hole 61 again as the pressure difference between the pressure inside the housing 10 and the atmospheric pressure decreases.

Accordingly, the flow regulating valve 50 may adjust the opening degree of the third communication hole 63 in response to a change in the pressure difference between the pressure inside the housing 10 and the atmospheric pressure.

The flow regulating valve 50 may also adjust a degree opening of the bypass flow path 40 by adjusting an elastic force of the elastic member 90.

That is, because when an elastic modulus of the elastic member 90 is small, the bypass flow path 40 may be opened even in a state where the pressure difference between the inside and outside of the housing 10 is relatively small, and when the elastic modulus of the elastic member 90 is large, the bypass flow path 40 may be opened only in a case where the pressure difference between the inside and outside of the housing 10 is relatively large, the flow regulating valve 50 may adjust the opening degree of the bypass flow path 40 by applying a different elastic modulus as the elastic member 90.

The elastic member 90 may include a coil spring 91 having one end supported on one end of the valve body 60 at a circumference of the second communication hole 62 and the other end supported on one end surface of the valve stem 70 corresponding to the second communication hole 62.

As the elastic member 90 provided as the coil spring 91 described above elastically supports the valve stem 70 in the direction of the first communication hole 61, the elastic member 90 does not significantly interfere with atmospheric pressure applied to the one end surface of the valve stem 70 through the second communication hole 62.

The passing flow path 71 of the valve stem 70 may be provided to enable alignment with the third communication hole 63. The passing flow path 71 and the third communication hole 63 may have the same inner diameter to enable alignment with each other.

Therefore, as the pressure inside the housing 10 increases such that the pressure difference with the atmospheric pressure increases, the valve stem 70 slides toward the second communication hole 62 so that the opening degree of the third communication hole 63 may be continuously increased.

The humidifier 1 for the fuel cell configured as described above may appropriately adjust the amount of humidification to be supplied to the fuel cell stack in response to the output of the fuel cell.

As illustrated in FIG. 2, when the pressure inside the housing 10 and the atmospheric pressure are the same, the valve stem 70 may be maintained in a communication Mate such that the passing flow path 71 is aligned with the third communication hole 63.

In this case, the valve stem 70 may be in a state of being slid to the maximum in the direction of the first communication hole 61 in a state of being elastically supported on the elastic member 90.

The third communication hole 63 aligned with the passing flow path 71 becomes in a maximum opened state, and the bypass flow path 40 in this state may bypass a maximum amount of dry air so that the amount of humidification to be supplied to the fuel cell stack is minimized.

A case in which the pressure inside the housing 10 and the atmospheric pressure are the same may correspond to a low output section of the fuel cell system in which the amount of air to be supplied to the fuel cell stack relatively decreases.

In the low output section of the fuel cell system, because the amount of water generated by the fuel cell is small, but an amount of heat generated by the fuel cell stack is relatively low and a flow rate of gas is small, so that the discharge of condensed water is decreased, the vicinity of fuel cells may be vulnerable to flooding due to a high relative humidity.

In this case, the bypass flow path 40, which bypasses the maximum amount of air, minimizes the amount of humidification to be supplied to the fuel cell stack, so that by suppressing the occurrence of flooding in the fuel cell stack due to an excessive amount of humidification, deterioration in durability of the fuel cell stack may be prevented.

In this state, as the pressure inside the housing 10 increases such that the pressure difference with the atmospheric pressure increases, the valve stem 70 may slide in the direction of the second communication hole 62 while compressing the elastic member 90 by the pressure inside the housing 10. Accordingly, as illustrated in FIG. 3, a cross-sectional area of the passing flow path 71 communicating with the third communication hole 63 may gradually decrease.

Therefore, the bypass flow path 40 may gradually bypass the dry air of an amount less than a maximum value so that the amount of humidification to be supplied to the fuel cell stack gradually increases.

In this state, when the pressure difference between the pressure inside the housing 10 and the atmospheric pressure becomes greater than a set value, as illustrated in FIG. 4, as the passing flow path 71 passes the third communication hole 63, the communication between the passing flow path 71 and the third communication hole 63 may be blocked.

Therefore, in this state, as the bypass flow path 40 is blocked, the amount of humidification to be supplied to the fuel cell stack may be maximized.

A case in which the pressure difference between the pressure inside the housing 10 and the atmospheric pressure is large may correspond to a high output section of the fuel cell system in which the amount of air to be supplied to the fuel cell stack relatively increases.

In the high output section of the fuel cell system, because the amount of moisture generated by the fuel cell is large, but the fuel cell stack generates heat at a high temperature and has a relatively high temperature and the flow rate of the gas increases, so that the discharge of condensed water is increased, the vicinity of the fuel cells may be vulnerable to drying due to a low relative humidity.

In this case, the blocked bypass flow path 40 maintains the amount of humidification to be supplied to the fuel cell stack to a maximum, so that by suppressing the occurrence of drying in the fuel cell stack due to an insufficient amount of humidification, deterioration in performance of the fuel cell stack may be prevented.

Figure 6:
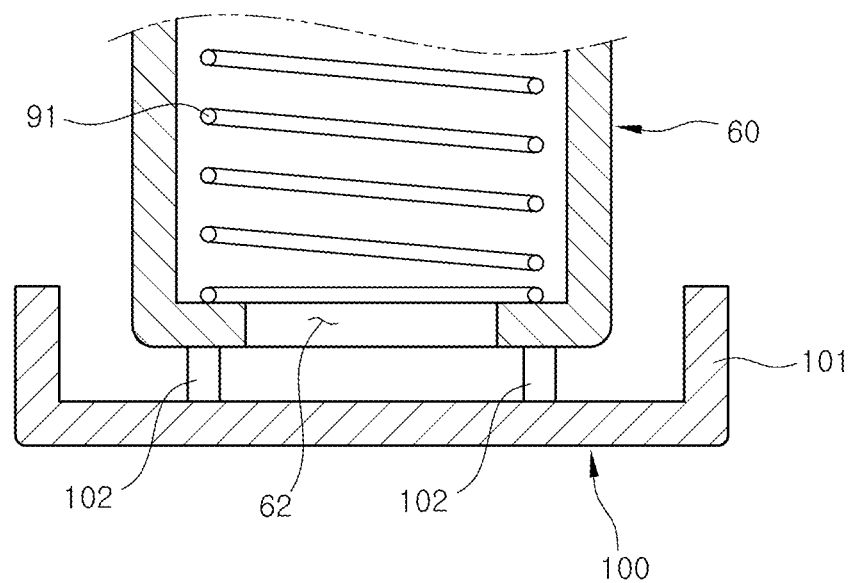
FIG. 6 is a main partial view illustrating a modified example of the flow regulating valve in the humidifier for the fuel cell according to an embodiment.

As illustrated in FIG. 6, the flow regulating valve 50 may include a foreign matter blocking cover 100 coupled to the other end of the valve body 60 to block the inflow of foreign matter in the atmosphere into the second communication hole 62.

The foreign matter blocking cover 100 blocks the inflow of foreign matter through an end of the valve body 60 exposed to the outside while allowing the atmospheric pressure to act on the valve stem 70, so that the sliding operation of the valve stem 70 may be prevented from being interfered with by foreign matter.

The foreign matter blocking cover 100 may include a cover part 101 provided to cover the other end of the valve body 60 in a state of being spaced apart from the valve body 60, and a plurality of connecting parts 102 disposed to be spaced apart from each other along a circumference of the second communication hole 62 to connect the valve body 60 and the cover part 101.

The cover part 101 may cover the second communication hole 62 in a spaced state to block the inflow of foreign matter into the second communication hole 62, and the plurality of connecting parts 102 may integrally connect the cover part 102 and the valve body 60 while communicating the second communication hole 62 with the outside through a gap between the cover part 101 and the second communication hole 62.

A pressure outside the housing 10 for driving the flow regulating valve 50 is not limited to the atmospheric pressure.

Figure 7:
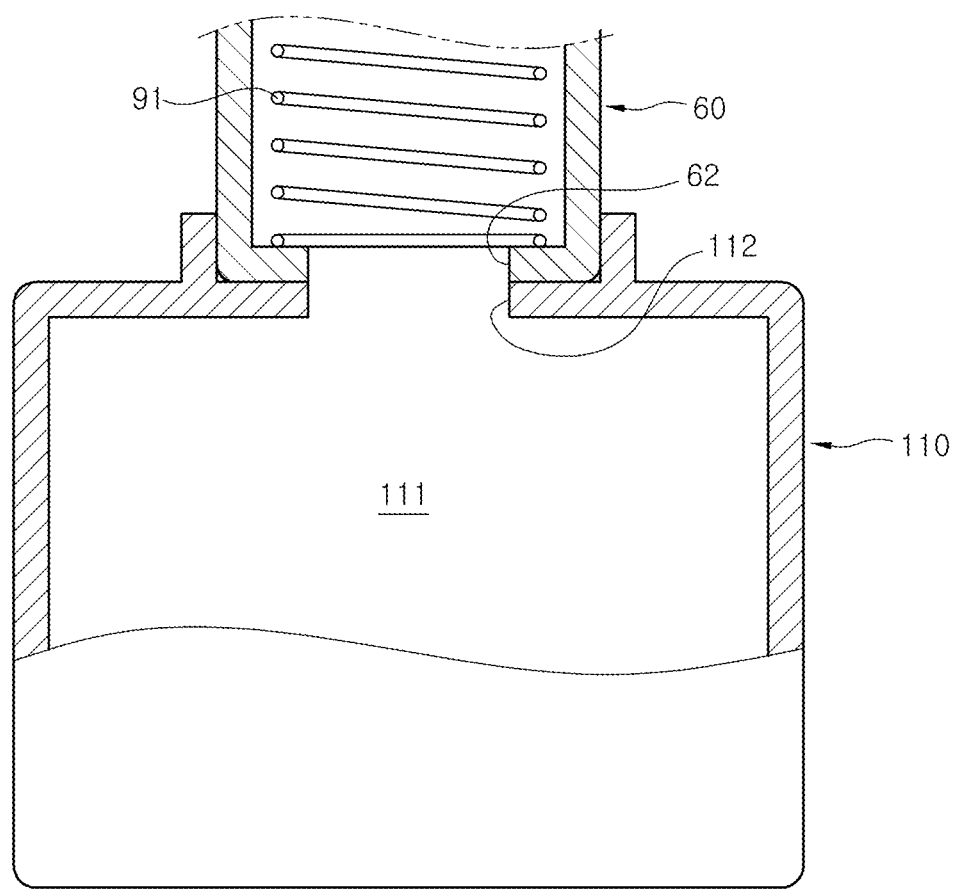
FIG. 7 is a main partial view illustrating another modified example of the flow regulating valve in the humidifier for the fuel cell according to an embodiment.

As illustrated in FIG. 7, the pressure outside the housing 10 for driving the flow regulating valve 50 may be provided through a closed space 111.

To this end, a casing 110 for providing the closed space 111 may be coupled to the valve body 60. The casing 110 may be coupled to the valve body 60 such that an inlet 112 thereof communicates with the second communication hole 62, and in this state, the closed space 111 inside the casing 110 may be maintained in a specific pressure, thereby causing a pressure difference with the pressure inside the housing 10.

According to the installation structure of the flow regulating valve 50 as described above, even when a separate foreign matter blocking cover is not provided, foreign matter outside the housing 10 may not be introduced into the flow regulating valve 50.

In addition, in the structure of the flow regulating valve 50 as described above, the pressure of the closed space 111 may increase by the valve stem 70 moving in the direction of the closed space 111, and thus when the pressure of the closed space 111 is close to the pressure inside the housing 10, the operation of the flow regulating valve 50 may not be smooth.

Therefore, it may be appropriate that the casing 110 is provided such that the closed space 111 has a predetermined size or more to ensure a smooth operation of the flow regulating valve 50.

As is apparent from the above, according to a humidifier for a fuel cell according to an embodiment, by providing a flow regulating valve that is driven using a pressure difference between a pressure inside a housing and atmospheric pressure as a power source, an amount of humidification to be supplied to a fuel cell stack can be adjusted in response to the output of the fuel cell without using an electromagnetic valve.

While a number of exemplary aspects and embodiments have been discussed above, those of skill in the art will recognize that still further modifications, permutations, additions and sub-combinations thereof of the features of the disclosed embodiments are still possible. It is therefore intended that the following appended claims and claims hereafter introduced are interpreted to include all such modifications, permutations, additions and sub-combinations as are within their true spirit and scope.

The invention claimed is:

1. A humidifier for a fuel cell; which is provided to humidify dry air to be supplied to a fuel cell stack with wet air discharged from the fuel cell stack, comprising:

a housing configured to allow dry air and wet air to pass through an inside of the housing;

a moisture transfer member positioned in the housing, the moisture transfer member being configured to transfer moisture in the wet air to the dry air;

a bypass flow path configured to guide a part of the dry air to bypass the housing; and a flow regulating valve configured to be driven using a pressure difference between the inside and outside of the housing as a power source to adjust a flow rate of the dry air passing through the bypass flow path.

2. The humidifier according to claim 1, wherein the flow regulating valve comprises:

a hollow valve body comprising a first communication hole at one end configured to communicate with the inside of the housing, a second communication hole at an other end of the hollow valve body, the second communication hole being configured to communicate with an outside of the housing, and a pair of third communication holes positioned on opposite sides between the one end and the other end of the hollow valve body, the pair of third communication holes being configured to communicate with a middle portion of the bypass flow path; and a valve stem slidably mounted on the hollow valve body between the first communication hole and the second communication hole, the valve stem being configured to adjust an opening degree of each of the third communication holes.

3. The humidifier according to claim 2, wherein when a pressure inside the housing is greater than a pressure outside the housing, the valve stem slides toward the second communication hole by the pressure inside the housing acting toward one end surface in a longitudinal direction thereof through the first communication hole.

4. The humidifier according to claim 3, wherein the valve stem has a passing flow path configured to penetrate the valve stem in a direction orthogonal to a sliding direction of the valve stem to enable communication with each of the third communication holes.

5. The humidifier according to claim 2, wherein the flow regulating valve comprises an elastic member disposed between the second communication hole and the valve stem to elastically support the valve stem.

6. The humidifier according to claim 5, wherein the elastic member comprises a coil spring having one end supported on one end of the valve body at a circumference of the second communication hole, and an other end supported on one end surface of the valve stem corresponding to the second communication hole.

7. The humidifier according to claim 4, wherein the passing flow path is provided to enable alignment with each of the third communication holes.

8. The humidifier according to claim 7, wherein when the pressure inside the housing and the pressure outside the housing are the same, the valve stem is maintained in a communication state such that the passing flow path is aligned with each of the third communication holes.

9. The humidifier according to claim 8, wherein as the pressure inside the housing increases such that the pressure difference with the pressure outside the housing increases, the valve stem moves such that a cross-sectional area of the passing flow path communicating with each of the third communication holes decreases.

10. The humidifier according to claim 9, wherein when the pressure difference becomes larger than the set value, the valve stem moves such that the communication between the passing flow path and each of the third communication holes is blocked.

11. The humidifier according to claim 2, wherein the flow regulating valve further comprises a sealing member configured to seal a gap between an inner circumference of the hollow valve body and an outer circumference of the valve stem.

12. The humidifier according to claim 11, wherein
an installation groove for installing the sealing member is provided on the inner circumference of the hollow valve body, and the sealing member is inserted into the installation groove.

13. The humidifier according to claim 1, wherein the pressure outside the housing is atmospheric pressure.

14. The humidifier according to claim 2, wherein the pressure outside the housing is atmospheric pressure, and the flow regulating valve further comprises a foreign matter blocking cover coupled to the other end of the hollow valve body to block the inflow of foreign matter into the second communication hole.

15. The humidifier according to claim 14, wherein the foreign matter blocking cover comprises:
a cover part configured to cover the other end of the valve body when the cover part is spaced apart from the valve body; and
a plurality of connecting parts spaced apart from each other along a circumference of the second communication hole to connect the hollow valve body and the cover part.

16. The humidifier according to claim 2, wherein a friction reducing layer is provided on at least one of an inner circumferential surface of the hollow valve body and an outer circumferential surface of the valve stem.

17. The humidifier according to claim 1, wherein the pressure outside the housing is provided by a closed space.

\* \* \* \* \*